G. Nearstheimer.
Metallic Coffin.

N° 88,728. Patented Apr. 6, 1869.

Witnesses
Thomas Johnson
George Smith

Inventor
George Nearstheimer
By Knight Bros
Atty's

GEORGE NEARSTHEIMER, OF CINCINNATI, OHIO.

Letters Patent No. 88,728, dated April 6, 1869.

IMPROVED METALLIC COFFIN.

The Schedule referred to in these Letters Patent and making part of the same.

*To whom it may concern:*

Be it known that I, GEORGE NEARSTHEIMER, of Cincinnati, Hamilton county, Ohio, have invented certain new and useful Improvements in Metallic Coffins; and I hereby declare the following to be a full, clear, and exact description thereof, reference being had to the accompanying drawings, making part of this specification.

My invention relates to the construction of metallic coffins, having cast-zinc supports at the angles and at other places within the rims, which cast-zinc supports also present sufficient substance to receive the screws or bolts necessary to fasten the top and bottom together.

It also relates to a form of safety-valve capable of being adjusted to sustain a designated pressure, but to open and relieve the interior of the coffin of such pressure as would endanger the bursting of the coffin.

The bottom of the coffin-body is formed of a piece of galvanized sheet-iron, A, stiffened by ribs *a* of similar material.

Figure 1:
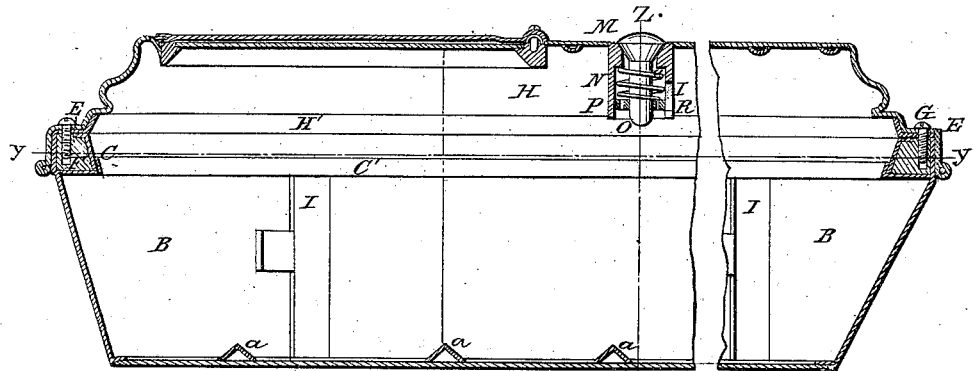
Figure 1 is a longitudinal section on the line X–X, fig. 2.
Figure 2:
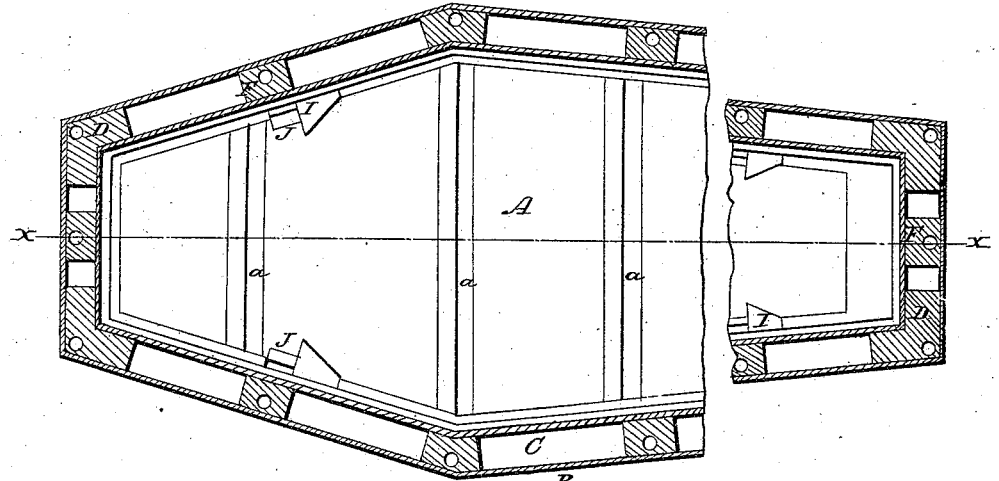
Figure 2 is a horizontal section on the line Y–Y, fig. 1.

The sides B are formed of pieces of sheet-zinc, whose upper edges are bent over and inward, as shown in figs. 1 and 2, so as to form a stiff, as well as ornamental hollow rim, C.

This rim C receives at each angle an angular plug, D, of cast-zinc, having a screw-threaded perforation, surrounded by a boss, E, which rises through a corresponding hole in the rim, and enables the two to be soldered together.

F is a number of smaller plugs, similarly secured within the rim, and like the plugs D, provided with screw-holes.

These screw-holes in the said plugs serve as nuts to receive the screws G, employed to fasten down the lid H of the coffin. The said plugs also assist to stay and stiffen the rim.

H' is a galvanized-iron frame, soldered underneath the rim of the lid.

C' is a galvanized-iron frame, similar in construction to H', and forming the bottom of the hollow rim C.

I are ribs, of galvanized sheet-iron, whose upper and lower ends are respectively soldered to the rim and the bottom.

These ribs have soldered to them cast-zinc nuts J for the handle-screws. These ribs serve a double purpose, namely, that of stiffening the coffin-body, and that of affording secure points of attachment for the handles.

The coffin-lid has a conical perforation, M, to afford a "seat" for a corresponding poppet-valve, N, whose screw-threaded stem, O, passing downward, and being furnished with a suitable nut, P, and with a spiral spring, Q, the valve is held down upon its seat with a greater or less pressure, according to the tension of the spring, and this tension is capable of being graduated even after the closure of the coffin, by simply screwing the stem O to the right or left.

The rotation of the nut is prevented by a tongue, R, occupying a slot, *s*, in the chamber S, which depends from the under side of the lid.

Figure 3:
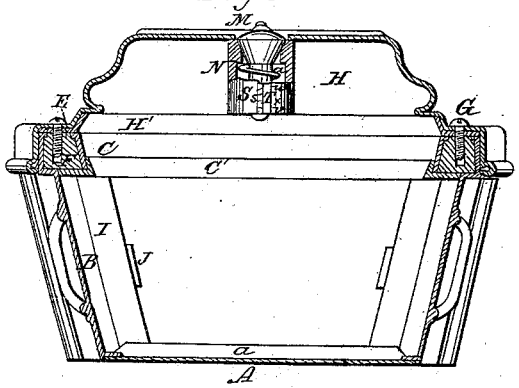
Figure 3 is a transverse section on the line Z–Z, fig. 1.

This tongue may extend entirely through the slot *s*, as shown in figs. 1 and 3, and may, in connection with a scale, T, marked on the chamber, indicate the pounds' pressure to which the valve is or may be set.

I claim herein as new, and of my invention—

1. The arrangement of the bottom, A *a*, sides B, hollow rim C, angular and screw-threaded plugs D E, and frame C', for the purpose set forth.

2. In combination with the elements A *a*, B, C, D E, and C', the short plugs F.

3. The described combination of the parts A *a*, B, C, D E, F, and C', with the ribs I and nuts J, formed and secured as set forth.

4. The screw-threaded stem O, the nut P, spiral spring Q, the tongue R, slot *s*, in the chamber S, and the graduated scale T, constructed and arranged to act as and for the purposes set forth.

In testimony of which invention, I hereunto set my hand.

GEORGE NEARSTHEIMER.

Witnesses:
GEO. H. KNIGHT,
JAMES H. LAYMAN.